United States Patent Office 3,357,791
Patented Dec. 12, 1967

3,357,791
PROCESS FOR PRODUCING COLLOIDAL-SIZE PARTICLES OF ALUMINA MONOHYDRATE
Donald R. Napier, Ponca City, Okla., assignor to Continental Oil Company, Ponca City, Okla., a corporation of Delaware
No Drawing. Filed July 20, 1964, Ser. No. 385,550
5 Claims. (Cl. 23—143)

ABSTRACT OF THE DISCLOSURE

Colloidal alpha-alumina monohydrate of extremely low inorganic impurity content is produced by hydrolyzing an aluminum alkoxide and contacting the alumina thus formed with aqueous acetic acid under specified conditions.

---

This application is a continuation-in-part of my copending application Ser. No. 310,182, filed July 11, 1963, and now abandoned.

This invention relates to a process for preparing high purity colloidal alumina monohydrate particles, and to the particles thus produced. In one aspect, the invention relates to a process for preparing colloidal alumina monohydrate by contacting an alumina resulting from hydrolysis of an aluminum alkoxide with an acid, and to the resulting product. In another aspect, the invention relates to the preparation of colloidal alumina monohydrate fibers by contacting an alumina resulting from hydrolysis of an aluminum alkoxide with an acid, and to the product thus produced.

There is in the literature a process for the preparation of fibrous alumina monohydrate; this is in U.S. Patent 2,915,475. In the process of U.S. 2,915,475, the chemical systems from which fibrous alumina monohydrate is produced must contain a monobasic acid radical derived from an acid having a dissociation constant greater than 0.1 at 25° C. The products thus produced contain a relatively large amount of other inorganic elements in addition to the desired alumina product. For many uses, it would, of course, be desirable to be able to produce a colloidal alumina monohydrate of high purity. Further, it would be desirable to have an alumina powder product which could be readily dispersed for such applications as coating.

Accordingly, it is an object of this invention to provide an alumina monohydrate of high purity. It is another object of this invention to provide a process for producing a fibrous alumina monohydrate. It is a further object of this invention to provide a simple process for preparing alumina monohydrate of the boehmite structure, which process is capable of producing particles of a wide variety of physical characteristics. It is another object of the invention to provide a readily dispersible colloidal alpha-alumina monohydrate. It is still another object of the invention to provide an alumina monohydrate which forms a thixotropic dispersion.

Other aspects and objects and the several advantages of the invention will become apparent upon study of this disclosure and the appended claims.

According to the invention, there is provided a process for producing colloidal-size particles of alpha-alumina monohydrate of a boehmite structure, said particles being further characterized by having only trace amounts of inorganic impurities, which process comprises contacting an alumina resulting from hydrolysis of an aluminum alcoholate with an acid for a period of time sufficient to form the desired particle size, and recovering the thus-formed particles.

In one embodiment of this invention an aluminum alcoholate is hydrolyzed, as by reaction with water, to form nonfibrous boehmite-type alumina monohydrate and alcohols, which are subsequently separated. The separated nonfibrous alumina monohydrate is then contacted with acid until alumina monohydrate having the boehmite structure is formed. In another embodiment of the invention, the separated nonfibrous alumina monohydrate is treated to remove at least a portion of its free water content prior to the contacting with acid. In both these embodiments, the contacting with acid can be effected in various manners, e.g. as by heating or vigorous mechanical working in contact with the acid.

The material used in the preparation of alumina monohydrate particles according to this invention is alumina prepared by hydrolysis of aluminum alcoholates, especially oxidized "growth" product aluminum alcoholates of the general formula

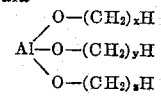

where the values of $x$, $y$ and $z$ each range from 2 to about 100. Among the alkoxides suitable for the practice of my invention are triethoxyaluminum, diethoxyaluminum n-butoxide, ethoxybutoxyaluminum n-pentoxide and tri-n-dodecanoxyaluminum. Further details of the oxidized "growth" product, and a process for its preparation, are disclosed in U.S. Patent 3,053,905, issued Sept. 11, 1962, to Donald M. Coyne et al. Aluminum alkoxides of branched carbon chains are also suitable starting materials according to my invention.

The nonfibrous alpha-alumina monohydrate used as an intermediate is of the boehmite structure and is preferably prepared in a highly hydrated or wet form in one embodiment; the wet alumina monohydrate should not be dried or subjected to any treatment which would result in the loss of more than a few percent of its contained water. According to a second embodiment, I have observed that dry or nearly dry boehmite intermediates are disposed to form blade-shaped or platelet-like rather than fibrillar aluminas when treated with acid. Treatments such as prolonged storage or exposure to or contamination with extraneous materials are also conducive to formation of blade-shaped or short fibrous products; very long fibers of high axial ratio are best obtainable from freshly formed or carefully kept hydrated aluminas. The alpha-alumina intermediate prepared by hydrolysis of the alkoxide appears to be generally spheroidal or as platelets in habit, and is usually of a particle size of about 0.005 to about 0.048 micron. Because of hydrogen bonding and/or other strong adhesive forces, the platelets tend to agglomerate into large noncolloidal particles, and these show little tendency to disperse in water. In the presence of weak acids the hydroxyl groups of alumina monohydrate become protonated and as a consequence fewer hydroxyl groups are available for hydrogen bonding. In the case of agglomerated particles, only the surface hydroxyl groups are affected and, except in the presence of strong acids or at elevated temperatures, protonation does not lead to particle disintegration. However, as contemplated in the present invention, particle break-down is effected primarily by mechanical working or elevated temperatures and, because of the presence of e.g. acetic acid, there is little tendency for the fragments to reagglomerate. Instead there are formed, ultimately, minute positively charged colloids.

Suitable alumina monohydrate intermediates can also be defined in terms of their $\theta$ values, which is the time, in minutes, required to effect conversion of one-half of the alumina, calculated as $Al_2O_3$, to aluminum chloride wth concentrated aqueous hydrochloric acid (100% excess) at 98° C. It is preferred that the alumina monohydrate intermediate have a $\theta$ of less than 10 minutes when preparing a fibrous product; theta is not critical when preparing a nonfibrous product.

The products of this invention are minute, positively charged particles which are composed primarily of alumina monohydrate having the boehmite structure together with variable amounts of water, acid and aliphatic alcohol. Fibrous products of my invention are further characterized by their dimensions. The greatest dimension is the range of 300 to 30,000 angstroms; the second greatest is in the range of 20 to 400 angstroms, and the smallest is in the range of 10 to 50 angstroms. The fibers are produced in the form of stable aquasols or as dry, free-flowing powders which can be dispersed in water to form stable aquasols.

Although I have spoken of "fibrous" products, it should be noted that products of other physical characteristics can be formed according to the process of my invention. In fact, one feature of my process is its flexibility, whereby alumina monohydrate particles of very low or trace amounts of inorganic impurity (i.e. below 0.05 and preferably below 0.01 weight percent) can be made in a wide variety of physical forms. For example, the products can consist of minute, loosely agglomerated platelets having maximum average dimensions of about 300 angstroms; the products contain, in addition to alpha-alumina monohydrate of the boehmite structure, variable amounts of free and/or surface-adsorbed acetic acid—generally about 5–25 w/o and preferably about 10–15 w/o—along with lesser amounts of water and aliphatic alcohol. When preparing this product, either wet or dry alumina monohydrate intermediate can be used. The major variables which affect the particle size and shape of the product are time, temperature and manner of the acid treating, physical state of the nonfibrous intermediate, and the acid concentration. I presently prefer that acetic acid be used as the treating acid, since the resulting product contains very little inorganic impurity. However, other acids of both high and low ionization constant are operable. Such acids includes hydrochloric, nitric, formic, propionic and chloroacetic. When operating with the presently-preferred acetic acid, the present process produces an alumina product which is of exceptional purity with regard to its inorganic composition. The acid concentration in the solution, although not critical, affects the time required to produce a given particle size product, i.e. stronger acid concentrations require shorter heating time; the acid is present preferably to the extent of at least one weight percent based on alumina.

If the alumina monohydrate is added to water and stirred with a lab mixer, the alumina is dispersed only during the stirring. As soon as the stirring is stopped, nearly all of the alumina settles. Aqueous dispersions can be prepared by vigorous mechanical agitation in a Waring Blendor or colloid mill for about 15 minutes. The resulting dispersions are considerably different than those made by the acid technique. Specifically, the mechanical dispersions are less stable, more viscous, and composed of much larger agglomerated particles. A 5% aqueous dispersion has a pH of 7.4. If distilled water is used in preparing mechanical dispersions, stability can be increased by adding about 200 p.p.m. NaCl. The viscosity of the thixotropic mechanical dispersions can be increased by longer agitation. If the alumina concentration is increased above 10%, the dispersion becomes viscous more rapidly and results in bright white creams. In general, the lower the alumina concentration, the lower the stability. The mechanical dispersions cannot be diluted after preparation without adversely affecting stability. On the other hand, if some hydrochloric acid is added to the water, either before or after the addition of the alumina, and the mixture stirred for several minutes, an extremely stable dispersion results. The time of addition of the acid is also immaterial, i.e., the acid may even be added to the wet alumina filter cake before drying. In this case the subsequently dried product can be directly dispersed in water. A small amount of the alumina eventually precipitates, however. This precipitate ranges from a mere trace up to several percent of the original alumina charge, depending on the acid concentration, the initial condition of the charge alumina and the mixing time. An electron micrograph shows fewer aggregates and a predominance of smaller particles than in dispersions prepared by strictly mechanical means. About 1.9% hydrochloric acid based on the weight of the alumina monohydrate is desirable, although somewhat less will work. At about 2.8% hydrochloric acid based on the alumina monohydrate, only trace quantities of the alumina precipitates from the dispersion. Little is to be gained by going above this concentration, although if the higher acidity is not objectionable, a slightly larger quantity of acid will facilitate dispersion. This range of acid, i.e., the 1.9–2.8% expressed in molar amounts, is about .062–.092 mol of HCl per mol of alumina monohydrate. Moderate agitation (200 r.p.m., 1–15 minutes) after making solution slightly acidic (pH 4.5) with small quantity of either acetic acid or hydrochloric acid suffices. When using acetic acid, for alumina concentrations of over 5% alumina, 12% acetic acid on an alumina basis is preferred; for alumina concentrations of less than 5% alumina, 0.6% acetic acid on a total dispersion basis assures sufficient acidity. Slightly lower percentages of hydrochloric acid are sufficient. When using the acetic acid dispersing technique, the alumina should not have been previously dried to greater than about 70 weight percent $Al_2O_3$; when using hydrochloric acid, a dispersible product can be made from a more highly dried material. Fresh dispersions possess unusually low viscosities; however, aquasols containing over 15% alumina will form thixotropic gels on standing. Thixotropic gels can also be formed by increasing the pH of the acid dispersion to over 6.5 by the addition of basic materials or decreasing the pH to 1 or 2 with a strong acid. The addition of salts also increases viscosity, as shown below.

VISCOSITY OF 5% DISPERSIONS
USING 0.6% ACETIC ACID

| Salt Added | Viscosity, cps. | |
|---|---|---|
| | 7 r.p.m. | 60 r.p.m. |
| Control | | 5 |
| 1% $Na_2SO_4$ | 1,250 | 212 |
| 1% NaCl | 1,200 | 135 |
| 5% $Na_2SO_4$ | 1,700 | 460 |
| 5% NaCl | 2,500 | 700 |

Alumina dispersions made with the above acid technique have far superior stability to other commercially available dispersible dry aluminas. Dispersions made with the acid technique can be diluted without adversely affecting the stability of the dispersion. If the hydrochloric acid exceeds about 11% based on the alumina or about .36 mol HCl/mol $Al_2O_3 \cdot H_2O$, a dispersion of a slightly different nature occurs. This dispersion is more viscous and appears to be made up of somewhat larger particles. The concentration of the alumina monohydrate in these dispersions was generally 5%; however, no difficulty was encountered in making dispersions of 10%, and dispersions of even up to 25% alumina can be made. Sulfuric and phosphoric acids did not work, indicating there is more involved than merely the acidity. Acetic acid was effective but required a slightly larger amount and longer mixing times than did hydrochloric acid. Excess of acetic acid will not cause the change in character of the dispersion as previously described in the instance of hydrochloric acid. If these dispersions are made basic, a decided increase in viscosity occurs and results in a dispersion similar to that produced by using larger quantities of hydrochloric acid.

As mentioned, temperature and heating time also affect the rate of product growth. The heating is carried out above about 50° C., and more preferably above about 150° C. in order to obtain the desired fibrous products within a reasonable reaction time. Temperatures above about 300° C. appear to be undesirable, in that the formation is too rapid to be readily controlled. The heating period is preferably from about 1 minute to about 8 hours, and more preferably from about 10 minutes to about 6 hours.

Heating or acid contact time affects the final product size and shape in an unexpected manner. It is my theory, based on the many experiments I have made with alpha-alumina monohydrate, that the intermediate alumina prepared by hydrolysis of the alcoholate first begins to "grow" in essentially one direction. This growth passes through a "blade" or rod (low axial ratio) stage and continues until a long, slender fiber results. I have prepared fibrous alumina products with fiber lengths as long as about 30,000 angstroms and with axial ratios of 150:1 and even more. The growth axially then appears to essentially stop, and I believe that the maximum particle length is dependent primarily upon the "freshness" or freedom from surface contamination of the hydrolysis alumina. Thus, a freshly prepared moist alumina can be made to yield a more fibrous (i.e. higher axial ratio) product than can an aged or dried alumina. After the axial growth ceases, there follows an aggregation of individual fibers into parallel "bundles"; the fibers appear to fuse together. Upon further acid treating, the bundles appear to actually become shorter. The working or vigorous mechanical agitation of the hydrolysis alumina with acid, as contemplated by one embodiment of my invention, is not relied on primarily to reduce the ultimate particle size but rather to expose "fresh" faces upon which the acid can act and from which the particle growth can occur. Thus, by "working" is meant any operation which effects an abrasion of the particles, such as ball or rod milling, colloid milling, high speed stirring, and high pressure impingement of the particle slurry. High speed stirring of at least about 10,000 r.p.m. is presently preferred, simply because of the ease of maintaining the acid presence during milling, although ball milling is also highly suitable. Working can be conveniently effected at about room temperature, although higher temperatures accelerate passage of the alumina through the various phases. Acid concentration during working should, as during heating, be at least about one weight percent, and preferably at least about five weight percent. Working time can vary according to the product desired, and will usually range from about 1 minute to about 8 hours, and more preferably from about 10 minutes to about 3 hours.

The fibrous material exhibits a high degree of thixotropy, while the material of lower axial ratio, although it forms a stable sol, is generally not as thixotropic. However, as will be seen in the examples, I have discovered that a thixotropic product can be made with particles which are, surprisingly, not fibrous. Moderately concentrated aqueous dispersions of the platelet-form product of my invention show thixotropy which heretofore was though to be an exclusive property of the sols of fibrous aluminas, accordingly, these products are of value as thixotropes, anchoring agents, mordants, surface modifiers, textile finishing agents, and emulsifying and suspending agents. Similar applications have been suggested for fibrous aluminas, and the properties of the present products indicate that they are competitive with such materials.

The aqueous product dispersion of my invention can be converted to a dry, free-flowing powder in conventional manner. It is preferred that the drying step be of very short heating time, e.g., by flash or spray drying, since any drying which is effected at a temperature above about 50° C. in the presence of acid results in a further conversion of the alumina product. The dried product of my invention can be readily redispersed to form a stable suspension in, e.g., water. It can alternately, for other utilities such as calcining, be simply heated to produce alumina of other than the boehmite lattice structure characterized by extremely high purity, since there are present in the product only trace amounts of inert inorganics, and any organic residue present is readily volatilized.

The following examples are presented in further illustration of my invention.

A general procedure for preparing nonfibrous alumina monohydrate intemediate, which was used to prepare the starting alumina of all the following examples, is as follows: Triethylaluminum was grown with ethylene to an "M" value (mean number of added ethylene units per growth chain) of about 4.2. The growth product was then oxidized with air at a reaction temperature of about 90° F., pressure 50 p.s.i., and average residence time of about 3½ hours. The resulting aluminum alkoxides were then hydrolyzed to produce alcohols and alumina monohydrate. Hydrolysis can be effected by addition of water, or also by use of aqueous acids or bases such as alkali and alkaline earth hydroxides, nitric acid, sulfuric acid, hydrochloric acid or acetic acid; in this instance, water containing about ⅛ lb. ammonia per 100 lb. water was used in an amount of about 1.5 lb. water per lb. alkoxide, and hydrolysis temperature was about 230° F. In order to facilitate separation of the products, a variable amount of a third component—usually a normal aliphatic alcohol or hydrocarbon solvent—is introduced into the reaction mixture. In this instance, butanol in an amount of about 90 lb. per 100 lb. alkoxide was used. The reaction mixture splits into essentially two phases: an upper alcohol-rich, alumina-free phase, subsequently separated, and a lower water-alumina monohydrate phase, existing as a slurry and containing some unseparated alcohol and/or solvent. The alumina slurry was concentrated by filtration to produce a solid, highly hydrated cake. The alumina cake can be used without further treatment as raw material for the preparation of fibrous alumina or it can be subjected to further extractions and filtrations to produce a more alcohol-free alumina stock; otherwise, it is stored in a closed container and protected from contamination and dehydration until ready for use.

*Example I*

Oxidized growth product aluminum alcoholate was hydrolyzed in a continuous manner as outlined above with n-butanol being used as the third component of the reaction mixture. The wet alumina monohydrate produced contained, in addition to water, the equivalent of 15.9 w/o alumina monohydrate, about 20 w/o butanol, and about 2 w/o higher molecular weight alcohols. Further analyses, summarized in Table I, indicated that the alumina cake was virtually free of extraneous inorganic matter. Proof that the hydrated alumina is composed of alumina monohydrate having the boehmite structure was obtained by comparing the X-ray pattern of a partially dried sample with one of authentic boehmite. The results of that comparison are summarized in Table II. The alumina monohydrate exists primarily as supermicron-size agglomerates of irregularly shaped plates and spheres of about 50–300 angstroms diameter.

A sample (133 g.) of the above-described alumina monohydrate which had been prepared only about 5 minutes prior to sampling was placed in a 300 ml. stainless steel autoclave equipped with mechanical agitation and containing 67 grams of water and 20 ml. of glacial acetic acid. The system was heated at a rate such that the internal temperature rose from 25° C. to 160° C. in 0.63 hour. The temperature was maintained at 160° C. for a period of 3.0 hours. Samples, five in all, were drawn from the autoclave during this period and later examined under the electron microscope: #1 (10 mins.), #2 (30 mins.), #3 (40 mins.), #4 (60 mins.), #5 (180 mins.). The alumina monohydrate particles contained in these samples were described as follows:

| Sample No: | Sample description |
|---|---|
| 1 | Curled fibers mixed with unconverted starting material. Typical fiber dimensions: 600–2000 A. long x 130–150 A. wide x ≤20 A. thick. |
| 2 | Fibers, curled and straight mixed with starting material. Higher ratio of fibers to starting material than in #1. Typical fiber dimensions: 1400–2000 A. long x 150 A. wide x 20–25 A. thick. |
| 3 | Essentially all fibrillar product. Typical fiber dimensions: 1600–2000 A. long x 80–100 A. wide by 20–25 A. thick. |
| 4 | All fibrillar product. Typical fiber dimensions: 1600–2400 A. long x 80–100 A. wide x 20–25 A. thick. |
| 5 | Fibrillar product containing some blade-shaped material and side to side fused fibers. Typical fiber dimensions: 1600–3000 A. long x 160–320 A. wide x 30 A thick. |

The intermediate and final products, though of identical crystal structure, have different crystal habits; the product fibrillar alumina monohydrate is highly dispersed as is characteristic of charged colloids; whereas, the intermediate material is highly agglomerated.

The final product of this experiment was a highly thixotropic sol which exuded alcohol on standing.

Note should be made of the fact that neither intermediate nor product alumina monohydrates is greatly affected by dilute acetic acid at room temperatures and, therefore, the degree of conversion can be controlled by simply regulating the heating time at the higher temperature.

*Example II*

A sample of the hydrated alumina employed in Example I was aged in a closed container for 9 days at room temperature. This alumina, which had a $\theta$ value of about 4 minutes, was autoclaved with acetic acid exactly as described in Example I. Samples taken throughout the course of the 3-hour heating period and examined with the electron miscroscope appeared to be very similar to those of the corresponding samples of Example I.

*Example III*

The alumina monohydrate starting material of Example I, aged in a closed container for 19 days at room temperature, was partially freed of alcohols by extracting 3 times with heptane (1 part) in a Waring Blendor. The extracted cake had a $\theta$ of 7 mins. and contained the equivalent of 18.5 w/o alumina monohydrate which, as shown in Table II, was of the boehmite structure. A sample (127.5 g.) of the extracted cake was combined with 72.5 g. of water and 20 ml. of glacial acetic acid and then heated with agitation at 160° C. for 2.0 hours. The product was a highly thixotropic sol containing fibers having the following dimensions: 800–1600 A. long x 80–160 A. wide x 20 A. thick. A sample of the sol was vacuum dried at 100° C. to approximately 11.5% of its initial weight. The residue was triturated under benzene and then dried to form a white, free-flowing powder containing 10.5 w/o acetic acid and the equivalent of 88.2 w/o alumina monohydrate. X-ray analysis, shown in Table II, indicated the alumina monohydrate possessed the boehmite structure. The product could be dispersed in water to form stable, fluid sols.

*Example IV*

A sample (133 g.) of the heptane extracted alumina monohydrate of Example III was combined with 67 g. of water and 20 ml. of glacial acetic acid. The mixture was placed in a 300 ml. autoclave, heated with agitation to 160° C. in 0.5 hr. and held at that temperature for 1.0 hour. The product was a highly thixotropic sol containing fibers which were primarily of the following dimensions: 800–1600 A. long x 80–120 A. wide.

The autoclaving experiment was repeated and a 423 g. sample of the combined products was heated in a vacuum oven at 50–60° for 46 hours. The residue (52.5 g.) was triturated under benzene and then dried to a white, free-flowing powder containing 13.4 w/o acetic acid and the equivalent of 84.6 w/o alumina monohydrate. A 10 w/o dispersion of the product in water was stable and thixotropic and was shown by electron microscopy to contain particles having the following typical dimensions: 600–1600 A. long x 160–240 A. wide. The change in particle dimensions is believed to have occurred during the drying step. By increasing the rate of drying it is possible to prepare a solid containing fibers with dimensions nearly identical to those of the initially produced sol.

TABLE I.—TRACE ELEMENTAL ANALYSIS—STARTING MATERIAL EXAMPLE I

| Element: | Wt. percentage based on $Al_2O_3$ |
|---|---|
| Na | 0.0004 |
| Cr | <0.001 |
| Cu | 0.0003 |
| Ni | <0.001 |
| Ca | 0.001 |
| Mg | <0.001 |
| Ti | 0.001 |
| Mn | <0.001 |
| S | <0.001 |
| Cl | <0.001 |

TABLE II.—X-RAY MICROSCOPY DATA

| Boehmite ASTM Card 5-0190 | | Starting Material Used in Examples I, II | | Starting Material Used in Examples III, IV | | Product of Example III | |
|---|---|---|---|---|---|---|---|
| d in Angstroms | I/I₀ | d in Angstroms | I/I₀ | d in Angstroms | I/I₀ | d in Angstroms | I/I₀ |
| 6.11 | 100 | 6.24 | 100 | 6.20 | 100 | 6.14 | 100 |
| 3.164 | 65 | 3.166 | 124 | 3.164 | 116 | 3.18 | 94 |
| 2.346 | 53 | 2.342 | 102 | 2.294 | 89 | 2.34 | 96 |
| 1.980 | 6 | --- | --- | 1.975 | 18 | 1.977 | 11 |
| 1.860 | 32 | 1.860 | } 170 | 1.860 | } 123 | 1.860 | } 113 |
| 1.850 | 27 | 1.843 | | 1.850 | | 1.850 | |
| 1.770 | 6 | --- | --- | --- | --- | 1.772 | 14 |
| 1.662 | 13 | 1.668 | 14 | 1.663 | 17 | 1.660 | 19 |
| 1.527 | 6 | --- | --- | --- | --- | 1.524 | 7 |
| 1.453 | 16 | 1.453 | 45 | 1.453 | 32 | 1.448 | 33 |
| 1.434 | 9 | 1.431 | 88 | 1.437 | 54 | 1.434 | 40 |
| 1.412 | 1 | --- | --- | --- | --- | --- | --- |
| 1.396 | 2 | --- | --- | 1.400 | 16 | 1.395 | 18 |
| 1.383 | 6 | --- | --- | --- | --- | --- | --- |
| 1.369 | 2 | --- | --- | --- | --- | --- | --- |
| 1.312 | 15 | 1.310 | 48 | 1.312 | 15 | 1.306 | 34 |
| 1.1337 | 5 | --- | --- | --- | --- | --- | --- |

Example V

Acetic acid (24 g.), distilled water (76 g.) and 200 g. of wet "filter cake" (oxidized and hydrolyzed growth product of approx. composition: 16 w/o boehmite-type alumina monohydrate, 20 w/o butanol, 2 w/o higher alcohols, remainder water) was charged to a 1-qt. ceramic (all alpha-alumina) ball mill containing 1" balls and the mixture was milled for 5 hours. The thick homogeneous paste which formed was washed from the mill with 300 g. water, and the resulting sol was dried in a vacuum oven for 60 hours at 40–50° C. The residue was triturated under benzene, then redried to form a white, free-flowing powder containing 14 w/o acetic acid and an undetermined amount of boehmite-type alumina monohydrate (confirmed by X-ray analysis). The powder (1 part) dispersed in water (9 parts) to form a stable, moderately thixotropic, opaque sol. Electron microscopy indicated the product was composed of uniformly dispersed 200–300 A. platelets.

Example VI

The wet "filter cake" used in Example V was vacuum dried at 80° C. to a solid containing the equivalent of 75 w/o alumina monohydrate. The solid was then dry (ball) milled to a fine powder having a $\theta$ value of 7.9 mins. A 31.5 g. sample of the powder was combined with 180 ml. of water and 20 ml. acetic acid and the resulting mixture ball milled for 6.5 hours as described in Example V. The thick sol which formed was vacuum dried (60 hours at 40–50° C.); the residue was triturated under benzene, then redried and recovered as white, free-flowing powder containing 16.1 w/o acetic acid and the equivalent of 78.3 w/o alumina monohydrate having, according to X-ray analysis, a boehmite-type structure. A 10 w/o aquasol of the product was stable and moderately thixotropic. Electron microscopy of the dried sol showed uniformly distributed platelets measuring 100–300 angstroms.

Example VII

A 30 g. sample of a light tan, finely-divided alumina monohydrate (approx. 88 w/o, remainder water and butanol) having a theta value of 17.9 mins. was combined with 150 ml. of 10 w/o acetic acid. This mixture was ball milled for 6.5 hrs., as described in Examples V and VI. The resulting sol was vacuum dried and the residue triturated under benzene to form, after drying, light tan free-flowing powder containing 13.9 w/o acetic acid and the equivalent of 80 w/o alumina monohydrate (boehmite-type according to X-ray analysis). A 10 w/o dispersion of the product in water was viscous and, to a slight degree, thixotropic. After standing 24 hours, a small amount of water (in the form of a thin upper layer) separated from the sol. Electron microscopy showed a mixture of small, slightly agglomerated platelets and larger particles judged to be unconverted starting material.

Example VIII

A mixture of 10 w/o acetic acid (200 g.) and the dried starting alumina used in Example VI (31.5 g.) was stirred 3 hours with a Virtis "45" stirrer operated at 15,000 r.p.m. (two sets of parallel arrow-shaped blades with razor-sharp edges). A viscous, highly thixotropic, opalescent sol formed and this was worked up as described in the previous examples. The product (white, free-flowing powder) contained 21.2 w/o acetic acid and the equivalent of 73 w/o alumina monohydrate. A comparison of the X-ray patterns of this product and standard boehmite is given in Table III.

As shown in Table IV, only trace amounts of inorganic impurities are present in the starting and product aluminas of this example. The relatively large amount of silica present in the product alumina is believed to have originated from the glass container which held the acid-alumina mixture in the stirring operation. A stable, moderately thixotropic, opalescent aquasol was obtained by stirring 1 part of the product with 9 parts water.

Example IX

A 26.7 g. sample of the starting alumina used in Example VII was combined with 200 g. of 10 w/o acetic acid and the resulting mixture treated as described in Example VIII. The final product was a light tan powder containing 15.5 w/o acetic acid and the equivalent of 77 w/o alumina monohydrate (boehmite-type according to X-ray analysis). When 1 part of the powder was dispersed in 9 parts of water, a stable, opaque, fluid sol was obtained. Electron microscopy of this sol indicated 2000–4000 A. clusters of 200–500 A. platelets.

Example X

A 1-liter Erlenmeyer flask containing 200 g. of 10 w/o aqueous acetic acid and 31.5 g. of the starting alumina of Example VI was suspended in the treatment tank of a Model SG-3 Blackstone Ultrasonics vibrating machine (said to produce 20,000 vib./sec.). Water was added to the tank to a depth of 3 in. (liquid level in Erlenmeyer was slightly below that of water in tank) and then the instrument was actuated. After about 22 hours the product (viscous gel) was removed and worked up as described in the previous examples. One part of the product (white, free-flowing powder) dispersed in 9 parts water produced a stable, fluid, opaque sol. Electron microscopy of this sol indicated slightly agglomerated (but generally uniformly dispersed) 200–400 A. platelets. No unconverted starting material was seen. A control run was made in which the alumina monohydrate-acid mixture (same proportions used above) was allowed to stand for 48 hrs. The final product also produced a stable, fluid sol; however, electron microscopy indicated that it contained an appreciable amount of unconverted starting material.

TABLE III.—X-RAY PATTERNS OF PRODUCT EXAMPLE VIII AND STANDARD BOEHMITE

[Scanned from 10°, 2θ to 80°, 2θ using Cu Kα radiation, speed 1°/min.]

| Sample | | Standard Boehmite ASTM card 5-0190 | |
|---|---|---|---|
| d(A.) | I/I₀ | d(A.) | I/I₀ |
| 6.18 | 100 | 6.11 | 100 |
| 3.166 | 124 | 3.164 | 65 |
| 2.346 | 124 | 2.346 | 53 |
| 1.860 | ------- | 1.860 | 32 |
| 1.848 | 164 | 1.850 | 27 |
| 1.777 | 26 | 1.777 | 6 |
| 1.664 | 17 | 1.662 | 13 |
| 1.448 | 48 | 1.453 | 16 |
| 1.435 | 72 | 1.434 | 9 |
| 1.404 | 10 | 1.396 | 2 |
| 1.309 | 47 | 1.312 | 15 |
| 1.134 | 28 | 1.1337 | 5 |

TABLE IV.—TRACE ELEMENTAL ANALYSES

| Starting Material Example VIII, w/o | Element | Product Material Example VIII, w/o |
|---|---|---|
| <0.001 | Mg | <0.001 |
| <0.001 | Zn | <0.001 |
| <0.001 | Ba | <0.001 |
| 0.001 | Ca | 0.004 |
| <0.001 | Mn | <0.001 |
| <0.001 | Cr | <0.001 |
| 0.001 | Ti | <0.001 |
| <0.001 | Si | 0.025 |
| <0.001 | V | <0.001 |
| <0.001 | B | 0.0025 |
| <0.001 | K | 0.001 |
| <0.001 | Ag | <0.001 |
| <0.001 | Sn | <0.001 |
| <0.001 | Pb | <0.001 |
| 0.0003 | Cu | <0.001 |
| <0.001 | Fe | 0.003 |
| <0.001 | Ni | 0.001 |
| 0.0004 | Na | 0.0002 |
| <0.001 | S | 0.0004 |
| <0.001 | Cl | <0.001 |

Colloidal alumina products of this invention have a wide variety of utilities. Fibrous alumina products of the invention, preferably in a dry form, can be mixed with one or a combination of dry lubricants such as graphite, molybdenum sulfide, talc, and powdered mica. Compositions of this type can be used for lubricating the surface of metals during forming operations, including rolling, stamping, drawing, and die casting.

Fibrous boehmite, that is, fibrous alumina monohydrate having the boehmite crystal lattice, either dry or in a suitable organic solvent, can be mixed with volatile oils; for example, kerosene, gasoline, and naphtha, or with organic solvents such as benzene, carbon tetrachloride, etc. Such mixtures can be applied to surfaces for the same purposes as are set forth for dry mixtures.

Oils that can be used to make greases by admixture with fibrous boehmite as a thickener are the hydrocarbon oils, fluorocarbon oils, silicone oils, vegetable oils, stearic acid and other long chain fatty acids, polymeric esters, diesters, such as di-2-(ethyl hexyl) sebacate, cottonseed oil, whale oil, polyethers such as polyethylene oxide oils, castor oils; in fact any animal, vegetable or mineral oil can be used, and also synthetic chemicals having typical oily characteristics. Fibrous boehmite can also be used with hydrophilic oils, such as polyethylene oxide oils. Fibrous boehmite can also be used in any oil composition containing a water immiscible oil.

The proportion of fibrous boehmite used as a thickening agent will depend upon such factors as the character and viscosity of the oil, the nature of the grease which it is desired to produce, and the exact nature of the boehmite itself. While it is sometimes feasible to use as high as 70% of the boehmite in the grease composition, it will ordinarily be found that a smaller amount is adequate. The action of the boehmite is pronounced even with small amounts.

Fibrous bohemite can advantageously be included in cosmetics, either as a dry product or dispersed in a suitable organic liquid. Greases, salves, creams, cosmetic emulsions, hair oil, lipstick, face powder, anti-perspirants, deodorants, and theatrical make-up materials can be improved by incorporation of fibrous boehmite, in amounts of, say 1 to 20%. In aqueous formulations of such products, fibrous boehmite is especially useful as a thickening, emulsifying, dispersing and suspending agent.

Fibrous boehmite can also be used as an adsorbent or carrier for enzymes, viruses, alkaloids and various antibiotics and vaccines.

Because of its film-forming nature fibrous boehmite is useful in compositions for treating peptic ulcers, alone or in combination with conventional formulating agents. The fibrous alumina monohydrate products of the invention can be included as a thickener in food products, for example, in ice cream. The fibrous boehmite can be dyed with appropriate food dyes and added to food products to effect both thickening and coloring.

Inks, such as printing inks for letterpress, lithographic or gravure type processes, are improved by incorporation of fibrous boehmite as a dispersing, thickening and extending agent. Because of the film-forming properties of fibrous boehmite, superior adhesion to papers and fabrics is obtained, and clarity and definition of the print is improved.

Fibrous boehmite is useful at concentration of 0.5 to 25% as a thickener, dispersant or emulsifying agent in aqueous floor wax emulsions or pastes utilizing conventional components such as carnauba, candelilla, beeswax or synthetic waxes, and natural or synthetic resins. On drying, improved leveling and polishing properties may be realized, with better hardness, scuff resistance or anti-slip properties.

Fibrous boehmite can be incorporated into elastomer products in amounts of 1–30% by weight to improve strength and/or abrasion resistance. This can be done at any point in their manufacture, including the original formation of the polymer. Generally, however, fibrous boehmite will be incorporated by conventional milling and compounding techniques commonly employed with other fillers. The elastomer in which fibrous boehmite is incorporated according to this invention can be any rubber-like polymeric material.

Fibrous boehmite can be used in plastics in manners analogous, and in amounts comparable, to those described for the use in rubber. For example, fibrous boehmite can be used as reinforcing filler in making plastic films, coatings, paints, adhesives, or other plastic articles.

It is to be noted that fibrous boehmite can be used for the surface treatment of practically any type of article. Thus painted surfaces, solid plastic objects, paper, rubber articles, textiles and upholstery and other fabrics including pile fabrics such as rugs can be treated. The surfaces can be treated by applying a dried fibrous boehmite by vigorous rubbing, or more easily by applying an aqueous or organic sol of the boehmite.

Fibrous boehmite can be applied also to the surface of fibers, not only synthetic fibers such as nylon polyamides, "Orlon" acrylic, "Dacron" polyester, cellulose acetate and rayon, but also natural fibers such as wool, cotton, silk, ramie, hemp, alpaca, camel hair, fur, feathers, goat-hair, horsehair, and animal bristles generally. Not only can the fibrous boehmite be applied as a surface coating on individual fibers, but can also be impregnated onto the surfaces of twisted threads and woven textiles, as noted above. The treatment of such surfaces prevents the deposition and retention of soil and also beneficially modifies the surfaces in respect to the pick-up of static electricity.

Fibrous boemite can be incorporated into organic fibers prior to drawing and spinning, in amounts ranging from a trace up to high percentages, say 0.1 to 50%, depending upon the effects desired. Fibrous boehmite can be incorporated into fibers of the following polymeric types: nylon, "Orlon" acrylic fiber, cellulose acetate, polyvinyl chloride, polyethylene, rubber, "Teflon," polytetrafluoroethylene, "Dacron" polyester fiber and all synthetic organic compositions capable of being formed into threads or fibers. The fibrous boehmite may be incorporated into the fibers in various ways, including dispersion in the fiber melt, dispersion in the polymer latex prior to forming threads, dispersion in the polymer solutions prior to wet or dry spinning or incorporation into polymer sheeting which is subsequently slit into ribbons or threads.

In any of the foregoing uses and in many others, fibrous boehmite can be used as a lake substrate and added to any of the various compositions described.

Fibrous boemite when ignited above 1000° C. gives a fibrous form of anhydrous alpha-alumina. This novel fibrous alpha-alumina is useful in the manufacture of refractories by combining it with finely divided metal oxides and firing. Pure alumina sintered bodies can be prepared by compressing the dehydrated fibrous boemite before firing, preferably with a small amount of an organic binder which burns out the mass. Thus, organic soluble metal salts such as aluminum acetate or metal stearates may be used.

Porous or cellular ceramic bodies with higher compressive strength can be obtained by the incorporation of dehydrated fibrous boehmite. The ceramic body can be made by including in the original mix carbonaceous materials which are later burned out. Or destabilized hydrogen peroxide which evolves oxygen gas during heating can be used in place of the carbonaceous material.

Powdered metals are improved by incorporation of fibrous boehmite. The fibrous boehmite can be mixed with the powdered metals to form a thin insulating coating on the metal particles.

Fibrous boehmite can also be used in the production of the newer types of "cermets" or metal-ceramic composite structures, in conjunction with powdered metals such as chromium, nickle, cobalt, iron, etc. Such composite structures can be made by intimately mixing the finely divided metal and fibrous boehmite alone or in combination with other refractory oxides such as beryllia, chromia, magnesia, etc. and compressing or extruding at a high temperature in an inert or reducing atmosphere.

Fibrous boehmite as a thin, carefully dehydrated film on metals yields a thermal and electrical insulating protective coating. Thus it can be applied from a 2 to 10 percent sol to aluminum, which preferably has been cleaned to remove oxides. It can then be heated in boiling water to complete the protective coating.

Extremely thin films of fibrous boehmite can be used to promote the adhesion of two dissimilar materials by providing high surface area anchor points. For example, fibrous boehmite films can be used to improve the bond between a paint film and a metallic surface, between various polymer films such as "Mylar," copolyester of ethylene glycol and terephthalic acid, or regenerated cellulose and other substrates such as metals, glass or other films.

Binders for fibrous ceramic products such as rock wool and glass fibers are improved through the incorporation of 2 to 20% by weight of fibrous boehmite. The fibrous boehmite is highly substantive to surfaces containing silica and can act as a binder itself.

Fibrous boehmite can be used as a base for cracking catalysts and other alumina catalysts. The fibrous boehmite sols can be mixed with a silica sol to form a gel which after drying and dehydrating can be formed into pellets or mats. For example, chromia supported on a dehydrated fibrous boehmite or a silica alumina co-gel support can be used as a catalyst for the low pressure polymerization of 1-olefins, such as ethylene. The fibrous boehmite can be formed into suitable beads or particles together with other catalytic agents in conventional manner.

Films of fibrous boehmite can be used as such or in combination with minor amounts of organic and inorganic materials to modify the properties of fibrous boehmite films. For example, the films can be modified with polyvinyl alcohol, "Teflon" polytetrafluoroethylene, "Mylar" polyester film, polyethylene and polyvinyl fluoride.

Inorganic materials, especially those of a fibrous or plate-like nature, can also be used to modify fibrous boehmite films. For example, small amounts (e.g., less than 10–20%) of minerals such as bentonite, attapulgite, wollastonite, halloysite, kaolin, talc, exfoliated vermiculite, mica, especially waste mica splittings, asbestos, etc. can be used. Synthetic fibrous materials in small amounts such as glass fibers, "Fiberfrax" ceramic fiber, finer fractions of rock wool, etc., also can be used.

Fibrous boehmite is several times more efficient than alum in rosin-alum sized papers, and at the same time is able to cause an increase in the spreading of ink on the papers.

Fibrous alumina monohydrate is quite useful when incorporated either as a filler or as in situ mixtures with tobacco in cigarettes. At 1 to 10% concentration the products of this invention filter out a high percentage of the tars and other undesirable constituents of tobacco smoke and give a mild, free-burning, easily drawing cigarette.

Having thus described the invention by providing specific examples thereof, it is to be understood that no undue limitations or restrictions are to be drawn by reason thereof and that many variations and modifications are within the scope of the invention.

What is claimed is:

1. A process for producing colloidal-size particles of alpha-alumina monohydrate of a boehmite structure, said particles being further characterized by having only trace amounts of inorganic impurities, which process comprises hydrolyzing an aluminum alcoholate, contacting the resulting alumina with at least about 0.6 weight percent acetic acid based on alumina for at least about 1 minute so as to form the desired colloidal particle size, and recovering the thus-formed particles.

2. The process of claim 1 wherein said contacting comprises heating at above about 150° C.

3. The process of claim 1 wherein said contacting comprises vigorous agitation in the presence of acetic acid.

4. The process of claim 1 wherein the alumina is separated from at least a portion of the alcohol resulting from hydrolysis and dried to an alumina content of at least about 50 weight percent prior to said contacting.

5. The process of claim 1 wherein the resulting alumina has a metal content, other than aluminum, based on $Al_2O_3$, of at most about 0.05 weight percent.

References Cited
UNITED STATES PATENTS

| | | | |
|---|---|---|---|
| 2,805,920 | 9/1957 | Richardson | 23—143 |
| 2,915,475 | 12/1959 | Bugosh | 23—143 X |
| 2,970,892 | 2/1961 | Kirshenbaum | 23—143 |
| 3,031,417 | 4/1962 | Bruce | 23—143 X |
| 3,056,747 | 10/1962 | Arthur | 23—143 X |
| 3,245,919 | 4/1966 | Gring et al. | 23—143 X |
| 3,264,063 | 8/1966 | Carter | 23—143 |

OSCAR R. VERTIZ, *Primary Examiner.*

H. T. CARTER, *Assistant Examiner.*